US012680645B2

(12) United States Patent     (10) Patent No.: US 12,680,645 B2

Gresh et al.     (45) Date of Patent: Jul. 14, 2026

(54) PIPE ISOLATION DEVICE WITH BLEED SYSTEM

(71) Applicant: Team Industrial Services, Inc., Sugar Land, TX (US)

(72) Inventors: Brian Michael Gresh, Sugar Land, TX (US); David Benjamin Aldren, Sugar Land, TX (US); Rizk Ghafari, Sugar Land, TX (US)

(73) Assignee: Team Industrial Services, Inc., Sugar Land, TX (US)

( * ) Notice: Subject to any disclaimer, the term of this patent is extended or adjusted under 35 U.S.C. 154(b) by 650 days.

(21) Appl. No.: 18/022,450

(22) PCT Filed: Aug. 20, 2021

(86) PCT No.: PCT/US2021/046918

§ 371 (c)(1),
(2) Date: Feb. 21, 2023

(87) PCT Pub. No.: WO2022/055689

PCT Pub. Date: Mar. 17, 2022

(65) Prior Publication Data

US 2023/0392740 A1     Dec. 7, 2023

Related U.S. Application Data

(60) Provisional application No. 63/077,390, filed on Sep. 11, 2020.

(51) Int. Cl.
*F16L 55/07* (2006.01)
*F16L 55/105* (2006.01)

(52) U.S. Cl.
CPC ............. *F16L 55/07* (2013.01); *F16L 55/105* (2013.01); *F16K 2200/40* (2021.08); *F16K 2200/401* (2021.08)

(58) Field of Classification Search
CPC ............... F16K 31/523; F16K 31/5286; F16K 2200/40; F16K 2200/401; F16K 2200/402; F16L 37/002; F16L 55/105; F16L 55/124

(Continued)

(56) References Cited

U.S. PATENT DOCUMENTS 2,600,115 A * 6/1952 Kliewer, Sr. ............ F16K 3/186
                                        251/167
3,966,235 A * 6/1976 Lewis ..................... F16L 39/00
                                        285/325

(Continued)

FOREIGN PATENT DOCUMENTS

EP     2226546 A1 * 9/2010 ............ F16L 55/132
GB     1340431 A * 12/1973 ............ F16L 55/105

(Continued)

OTHER PUBLICATIONS

International Search Report and Written Opinion in related application PCT/US2021/046918 Dated Nov. 26, 2021.

(Continued)

*Primary Examiner* — Kenneth Rinehart
*Assistant Examiner* — Richard K. Durden
(74) *Attorney, Agent, or Firm* — Patterson + Sheridan, LLP

(57) ABSTRACT

A technique is provided for isolating a pipe during maintenance or servicing of the pipe. The technique may utilize a control bar head having a coupling feature for coupling with a control bar. The control bar head also has a bleed passage extending therethrough to the coupling feature and thus to the control bar when engaged with the control bar. Additionally, the system may comprise a first sealing head slidably engaged with the control bar head. The first sealing head may comprise a first seal element and a first sealing (Continued)

head bleed passage extending therethrough to the control bar head. The system also may comprise a second sealing head slidably engaged with the first sealing head and having a second seal element. The first sealing head bleed passage may be arranged to extend to a region between the first sealing head and the second sealing head to facilitate bleeding of this region.

17 Claims, 6 Drawing Sheets

(58) Field of Classification Search
USPC ............................................ 138/94; 285/325
See application file for complete search history.

(56) References Cited

U.S. PATENT DOCUMENTS

| | | | | | |
|---|---|---|---|---|---|
| 4,371,005 | A | * | 2/1983 | Morrill | E21B 43/0135 |
| | | | | | 138/90 |
| 4,477,205 | A | * | 10/1984 | Morrill | E21B 33/0387 |
| | | | | | 166/347 |
| 4,489,959 | A | * | 12/1984 | Satterwhite | E21B 33/038 |
| | | | | | 285/348 |
| 5,531,250 | A | * | 7/1996 | Freeman | F16L 55/124 |
| | | | | | 138/94 |
| 5,700,041 | A | * | 12/1997 | Andre | F16L 37/26 |
| | | | | | 285/349 |
| 6,659,133 | B2 | * | 12/2003 | Russell | F16L 55/124 |
| | | | | | 251/168 |
| 7,766,047 | B1 | * | 8/2010 | Garrison | F16L 55/124 |
| | | | | | 138/91 |
| 7,849,882 | B1 | * | 12/2010 | Lee | F16L 55/124 |
| | | | | | 138/91 |
| 7,866,347 | B2 | * | 1/2011 | Bowie | G01M 3/2853 |
| | | | | | 138/93 |
| 8,307,856 | B2 | * | 11/2012 | Yeazel | F16L 55/1283 |
| | | | | | 138/92 |
| 9,057,447 | B2 | * | 6/2015 | Bowie | F16K 15/00 |
| 2009/0114302 | A1 | | 5/2009 | Yeazel et al. | |
| 2014/0283926 | A1 | | 9/2014 | Duell | |
| 2019/0390814 | A1 | | 12/2019 | McKone et al. | |
| 2020/0309308 | A1 | * | 10/2020 | Naber | F16L 55/1141 |
| 2021/0325004 | A1 | * | 10/2021 | Gresh | F16L 55/105 |

FOREIGN PATENT DOCUMENTS

| | | | | | |
|---|---|---|---|---|---|
| KR | 20110128057 | A | * | 11/2011 | .......... F16L 55/1604 |
| WO | 2020047265 | A1 | | 3/2020 | |

OTHER PUBLICATIONS

European Search Report in related application EP 21867345.7 dated Dec. 18, 2024.

* cited by examiner

PIPE ISOLATION DEVICE WITH BLEED SYSTEM

CROSS-REFERENCE TO RELATED APPLICATION

The present document is based on and claims priority to U.S. Provisional Application Ser. No. 63/077,390, filed Sep. 11, 2020, which is incorporated herein by reference in its entirety.

FIELD OF DISCLOSURE

In general, the disclosure describes a pipe isolation device having a double seal and a bleed system connected into a control bar. The pipe isolation device may be used in pipelines carrying fluids such as pressurized fluids, high or low temperature fluids, steam, or hazardous fluids.

BACKGROUND OF DISCLOSURE

When performing pipeline maintenance or servicing, such as during hot tapping procedures, it is necessary to provide isolation of a "live" section of pipe. One such technique is using a "double isolation-and-bleed" apparatus, also referred to as a double block-and-bleed apparatus. As the term double isolation-and-bleed is known in the art, it refers to the setting of two seals in a pipe with a bleed port located therebetween. If fluid leaks past the first seal, it is contained by the second seal and forced to exit the pipe through the bleed port. However, existing bleed systems involve the use of extra items coupled with the pipe and this can involve extra time, expense, and/or additional weldments on the pipe being serviced.

What is needed is an improved, simplified, pipe isolation device with a bleed system which is able to provide a bleed route through a pipe isolation device actuator assembly, e.g. through a control bar forming part of the actuator assembly, to thus avoid the extra items conventionally associated with a bleed system.

SUMMARY

This summary is provided to introduce a selection of concepts that are further described below in the detailed description. However, many modifications are possible without materially departing from the teachings of this disclosure. Accordingly, such modifications are intended to be included within the scope of this disclosure as defined in the claims. This summary is not intended to identify key or essential features of the claimed subject matter, nor is it intended to be used as an aid in limiting the scope of the claimed subject matter.

According to an embodiment, a system and methodology are provided for isolating a pipe by moving a portion of the system through a lateral hole in the pipe so as to provide sealing engagement along an interior of the pipe during maintenance or servicing of the pipe. The system may comprise a control bar head having a coupling feature for coupling with a control bar. The control bar head also has a bleed passage extending therethrough to the coupling feature and thus to the control bar when engaged with the control bar. Additionally, the system comprises a first sealing head slidably engaged with the control bar head. The first sealing head has a first seal element and a first sealing head bleed passage therethrough. The first sealing head bleed passage extends to a bleed port gland which slidably engages the control bar head. The system also comprises a second sealing head slidably engaged with the first sealing head and having a second seal element. The first sealing head bleed passage is arranged to extend to a region between the first sealing head and the second sealing head to facilitate bleeding of this region.

BRIEF DESCRIPTION OF THE FIGURES

Certain embodiments of the disclosure will hereafter be described with reference to the accompanying drawings, wherein like reference numerals denote like elements. It is emphasized that, in accordance with standard practice in the industry, various features are not drawn to scale. In fact, the dimensions of various features may be arbitrarily increased or reduced for clarity of discussion. It should be understood, however, that the accompanying figures illustrate the various implementations described herein and are not meant to limit the scope of various technologies described herein, and.

DETAILED DESCRIPTION

Figure 1:
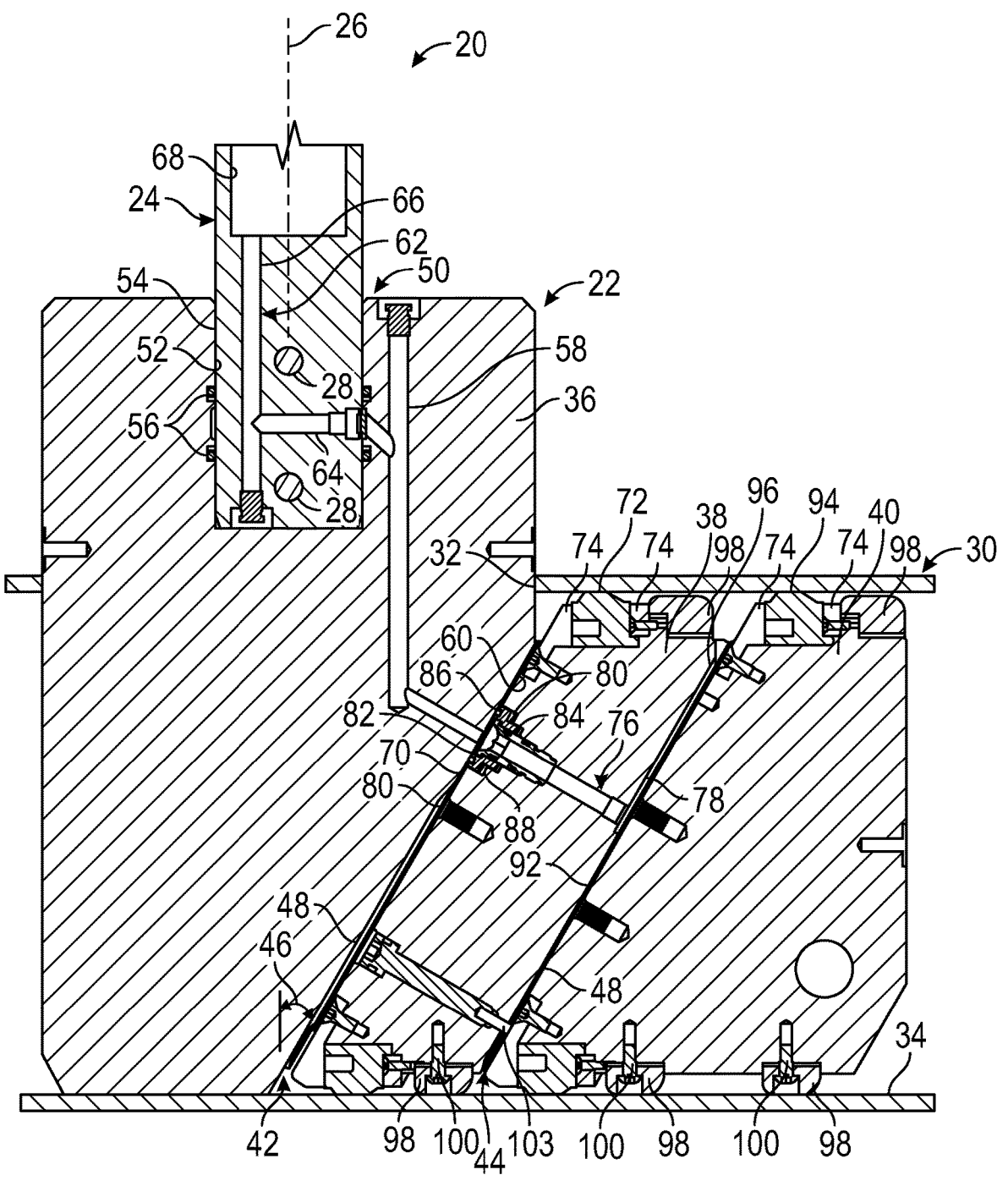
FIG. 1 is a cross-sectional view of a pipe isolation system having a control bar coupled with a pipe isolation device in accordance with embodiments of the present disclosure.

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements.

The present disclosure generally relates to a system and methodology for isolating a pipe for maintenance or other servicing. According to an embodiment, isolation of the pipe may be achieved by moving a portion of the system through a lateral hole in the pipe so as to provide sealing engagement along an interior of the pipe. In one type of application, a section of the pipe may be removed and replaced by utilizing two of the pipe isolation systems to enable servicing, e.g. removal and replacement, of the pipe section between the two pipe isolation systems. The double isolation and bleeding capability of each pipe isolation system facilitates their use in "live" sections of pipe carrying a wide variety of fluids under many pressure and temperature conditions.

By way of example, each pipe isolation system may comprise a control bar head having a coupling feature for coupling with a control bar. The control bar head also has a bleed passage extending therethrough to the coupling feature and thus to the control bar when engaged with the control bar. Additionally, the system comprises a first sealing head slidably engaged with the control bar head. The first sealing head has a first seal element and a first sealing head bleed passage therethrough. The first sealing head bleed passage extends to a bleed port gland which slidably engages the control bar head. The pipe isolation system also comprises a second sealing head slidably engaged with the first sealing head and having a second seal element. The first sealing head bleed passage is arranged to extend to a region between the first sealing head and the second sealing head to facilitate bleeding of this region to obtain a deenergized zone and to relieve pressure if pressure/fluid passes the first seal element. The slidability of the first and second sealing heads enables general linear alignment of the first and second sealing heads with the control bar head during insertion through the lateral hole in the pipe. As the second sealing head and the first sealing head bottom out inside the pipe during insertion, they slide to an angular configuration, e.g. a right angle configuration, with the control bar head and also seal along the interior of the pipe.

Figure 2:
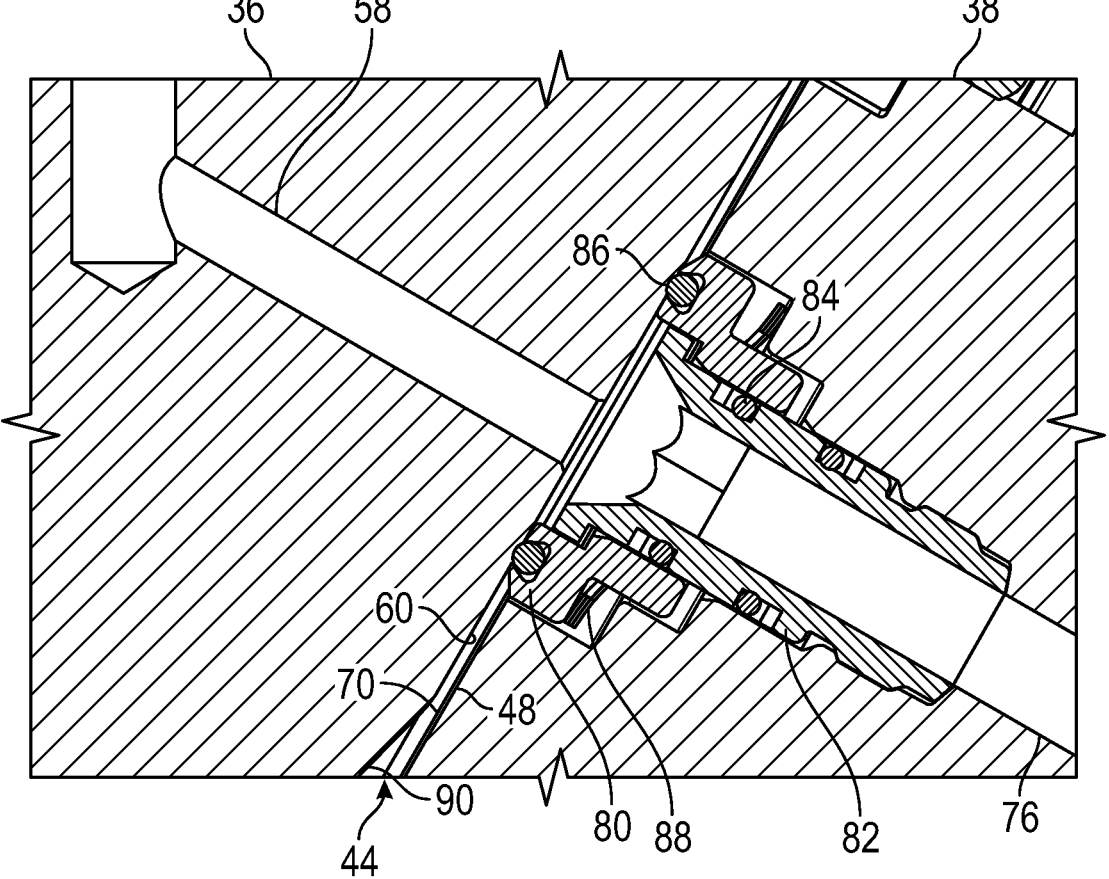
FIG. 2 is a cross-sectional view of a portion of the pipe isolation device illustrating the fluid coupling of bleed passages in accordance with embodiments of the present disclosure.
Figure 3:
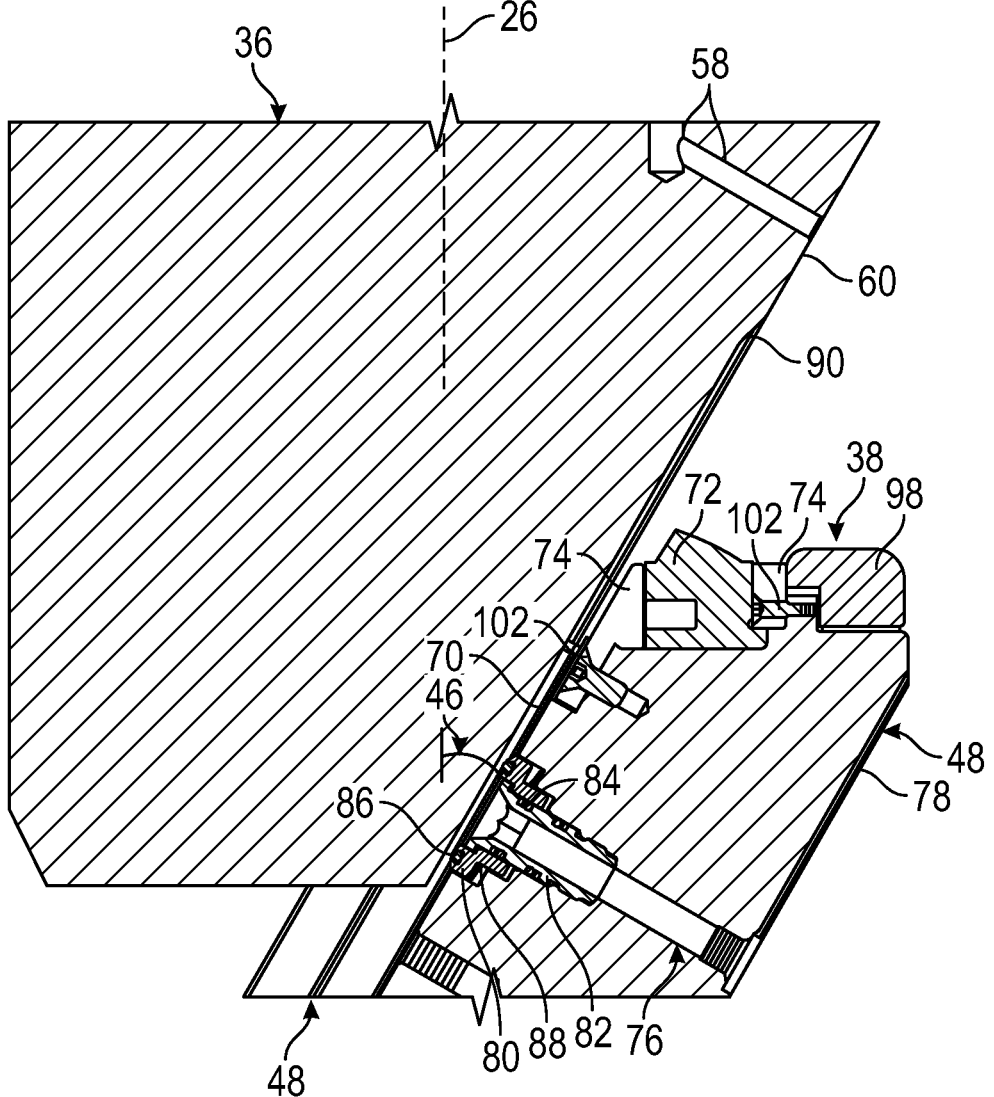
FIG. 3 is a cross-sectional view of a portion of the pipe isolation device illustrating the pipe isolation device in an insertion/withdrawal configuration in which the bleed passages are shifted out of alignment in accordance with embodiments of the present disclosure.

Referring generally to FIGS. 1-3, an embodiment of a portion of a pipe isolation system 20 is illustrated in cross-section as having a pipe isolation device 22 coupled with a control bar 24 which is linearly movable along an axis 26. By way of example, the control bar 24 may be coupled with pipe isolation device 22 via suitable fasteners 28, e.g. threaded fasteners. As described in greater detail below, the control bar 24 is part of an overall actuator used to position the pipe isolation device 22 within a pipe 30. Linear movement of the control bar 24 moves the pipe isolation device 22 through a lateral hole or opening 32 in the pipe 30 for proper positioning along an interior 34 of pipe 30. Linear movement of the control bar 24 in the opposite direction enables withdrawal of the pipe isolation device 22 from pipe 30 via lateral hole 32.

In the embodiment illustrated, the pipe isolation device 22 comprises a control bar head 36, a first sealing head 38, and a second sealing head 40 which are slidably engaged with each other. The control bar head 36, first sealing head 38, and second sealing head 40 are slidably engaged with each other to facilitate sliding transition between an insertion/withdrawal configuration in which heads 36, 38, 40 are generally aligned along axis 26 and an internal sealing configuration in which first and second sealing heads 38, 40 are shifted laterally along the interior of pipe 30 so as to form isolating seals along the interior of pipe 30, as illustrated in FIG. 1. For example, as the second sealing head 40 and the first sealing head 38 bottom out inside the pipe 30 during insertion, they slide to an angular configuration (e.g. the right angle configuration illustrated in FIG. 1) with the control bar head 36 and also seal along the interior of the pipe 30. This allows the pipe isolation device 22 to be inserted or withdrawn through lateral hole 32 while also accommodating sealing engagement with the interior of pipe 30 once inserted.

As illustrated, the pipe isolation device 22 comprises a first sliding engagement mechanism 42 which provides a slidable engagement connection between the control bar head 36 and the first sealing head 38. Similarly, the illustrated pipe isolation device 22 comprises a second sliding engagement mechanism 44 which provides a slidable engagement connection between the first sealing head 38 and the second sealing head 40. In this example, the sealing heads 38, 40 each generally have a disk shape and the sliding engagement mechanisms 42, 44 are arranged to enable sliding at an angle 46 relative to axis 26. The angle 46 is selected to enable general alignment of control bar head 36, first sealing head 38, and second sealing head 40 along axis 26 during insertion and withdrawal of pipe isolation device 22 through opening 32. By way of example, each sliding engagement mechanism 42, 44 may comprise interlocking rails 48 or other suitable interlocking slides which accommodate the angular sliding of first sealing head 38 relative to control bar head 36 and of second sealing head 40 relative to first sealing head 38.

Referring again to FIG. 1, the control bar head 36 comprises a coupling feature 50 which enables coupling with the control bar 24. By way of example, the coupling feature 50 may comprise a recess 52 sized to receive an attachment end 54 of control bar 24. The coupling feature 50 also may comprise other components, such as seals 56, e.g. O-ring seals, positioned between attachment end 54 and the surrounding wall forming recess 52. Additionally, coupling feature 50 may comprise fasteners 28 or other suitable attachment mechanisms to securely connect the control bar 24 with the control bar head 36.

In this example, the control bar head 36 also comprises a bleed passage 58 extending therethrough. As illustrated, the bleed passage 58 may extend from an engagement surface 60 of control bar head 36 to the coupling feature 50, e.g. to the recess 52. The engagement surface 60 is a surface adjacent first sealing head 38 and along which sealing head 38 is able to slide relative to control bar head 36. It should be noted the control bar 24 also may comprise an internal control bar bleed passage 62 having a lateral section 64 positioned in fluid communication with bleed passage 58 between seals 56. As illustrated, the control bar bleed passage 62 also may comprise a longitudinal section 66 extending from lateral section 64 and along an internal cavity 68 of control bar 24.

Additionally, the first sealing head 38 may comprise an engagement surface 70 arranged generally parallel with and along the engagement surface 60 of control bar head 36. The first sealing head 38 also may comprise one or more first seal elements 72 arranged around the circumference of the first sealing head 38 so as to form a sealing engagement with the interior surface of pipe 30. Each first seal element 72 may be held in place by retaining rings 74 or other suitable features which secure the seal element 72 and protect against unwanted seal extrusion when subjected to pressure along the interior of pipe 30.

Furthermore, first sealing head 38 comprises a first sealing head bleed passage 76 extending therethrough. For example, the first sealing head bleed passage 76 may extend between engagement surface 70 and an opposing engagement surface 78 which is adjacent second sealing head 40 and along which the second sealing head 40 is able to slide relative to first sealing head 38. The first sealing head bleed passage 76 may be effectively engaged with the control bar head 36 via a bleed port gland 80, as further illustrated in FIG. 2.

The bleed port gland 80 may be slidably engaged with a corresponding bleed passage nozzle 82 and sealed with respect to nozzle 82 via an intermediary seal 84. In the example illustrated, the bleed port gland 80 also is combined with a face seal 86, e.g. an O-ring face seal, which is positioned to form a sealing engagement between the bleed port gland 80 and control bar head 36 along engagement surface 60. The sealing engagement may be encouraged by biasing the bleed port gland 80 and face seal 86 toward surface 60 with a spring 88, e.g. a wave spring. Thus, when bleed passage 58 of control bar head 36 is aligned with bleed passage 76 of first sealing head 38, a seal is formed between control bar head 36 and first sealing head 38 to reduce or prevent leakage when fluid/pressure is bled. The sealing engagement of face seal 86 also may be encouraged via a differential pressure created across seals 86 and 84 during bleed down of internal pressure. This differential pressure further increases the compressing force acting on a seal 86. The bleed port gland 80 is thus able to slide into and out of engagement with bleed passage 58 while being spring biased via spring 88 to help form a seal with surface 60. Additionally, the illustrated geometry of bleed port gland 80 may be selected to further create a larger compression force between the sealing surfaces based on the pressure differential acting on bleed port gland 80.

During insertion or withdrawal of pipe isolation device 22, the first sealing head 38 slides with respect to control bar head 36 which shifts bleed passage 76 out of alignment with bleed passage 58, as illustrated in FIG. 3. As the first sealing head 38 and the control bar head 36 slide with respect to each other, the bleed passage 58 and bleed passage 76 are moved into and out of direct fluid communication with each other. In some embodiments, the engagement surface 60 of control bar head 36 may include a sloped or tapered portion 90 positioned so the spacing between engagement surface 60 and the face of bleed port gland 80 is expanded when the bleed passages 58, 76 are out of alignment. This reduces wear on face seal 86 during the sliding motion between first sealing head 38 and control bar head 36.

In the embodiment illustrated, the second sealing head 40 may comprise an engagement surface 92 arranged generally parallel with and along the engagement surface 78 of first sealing head 38 (see FIG. 1). The second sealing head 40 also may comprise one or more second seal elements 94 arranged around the circumference of the second sealing head so as to form a sealing engagement with the interior surface of pipe 30. Similar to first seal element 72, each second seal element 94 may be held in place by retaining rings 74 or other suitable features which secure the seal element 94 and protect against unwanted seal extrusion when subjected to pressure along the interior of pipe 30.

The first sealing head bleed passage 76 extends to a region 96 between first sealing head 38 and second sealing head 40 and defined by first seal element 72 and second seal element 94. During a maintenance or servicing operation, region 96 may initially be at line pressure and therefore region 96 is bled down via aligned bleed passages 76, 58 to achieve the desired double isolation. Additionally, if pressure/high-pressure fluid in pipe 30 is able to move past a seal element, e.g. seal element 72, into region 96, the aligned bleed passages 76 and 58 serve to bleed this excess pressure into control bar 24 via control bar bleed passage 62. As explained in greater detail below, the pressure/high-pressure fluid may be bled off along the interior of control bar 24. The ability to bleed off the high-pressure fluid before it potentially passes seal element 94 protects against the escape of high-pressure fluid from pipe along pipe interior 34. The seal elements 72, 94 and region 96 utilize the overall bleeding capability to provide pipe isolation device 22 with a double seal and a bleed system connected into the control bar 24.

Depending on the specifics of a given application, the pipe isolation device 22 may comprise other or additional components or features. For example, first sealing head 38 and second sealing head 40 may each comprise sliders 98, e.g. pads, mounted along their exteriors via threaded fasteners 100 or other suitable fastening mechanisms. The sliders 98 are positioned to prevent binding and to facilitate the sliding of seals 72, 94 along the interior 34 of pipe 30 as the pipe isolation device 22 is transitioned into and out of pipe 30. The pipe isolation device 22 also may utilize various attachment mechanisms 102 (see FIG. 3) to secure the retaining rings 74 or other components. In some embodiments, shear pins 103 (see FIG. 1) may be used to enable separation of components if needed.

Additionally, the pipe isolation device 22 may comprise various types of stops, e.g. setscrews or abutments, which limit the sliding travel of second sealing head 40 with respect to first sealing head 38 and of first sealing head 38 relative to control bar head 36, respectively. Thus, as the pipe isolation device 22 is removed from pipe 30, the second sealing head 40 and first sealing head 38 slide along their sliding engagement mechanisms 44, 42, respectively, until further sliding motion is prevented by such stops. The sliding motion is stopped when second sealing head 40, first sealing head 38, and control bar head 36 are generally aligned along axis 26 (see FIG. 3) to enable removal (or insertion) through opening 32.

Figures 4, 5:
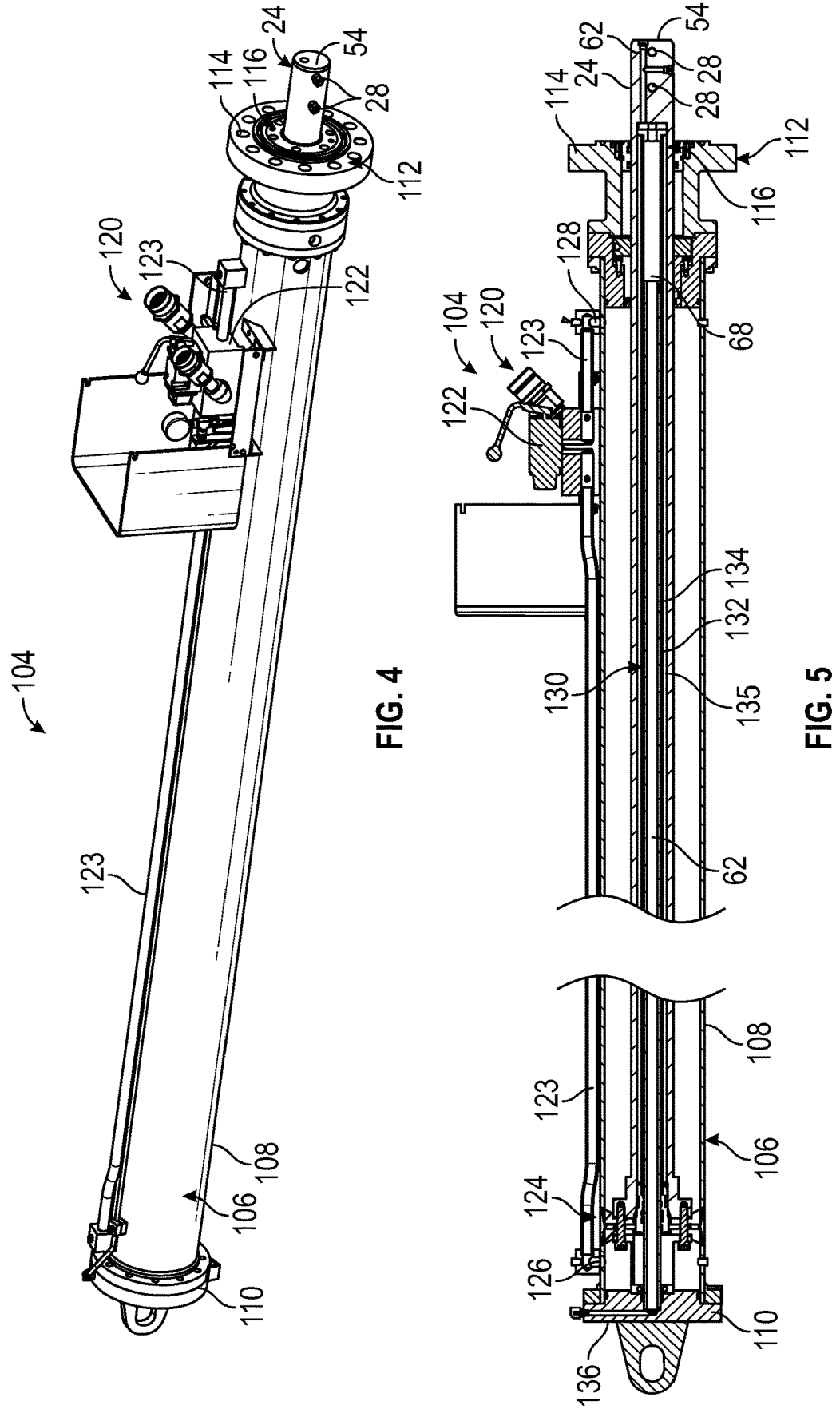
FIG. 4 is a perspective view of a pipe isolation device actuator including the control bar in accordance with embodiments of the present disclosure.
FIG. 5 is a cross-sectional view of the pipe isolation device actuator illustrated in FIG. 4 in accordance with embodiments of the present disclosure.

Referring generally to FIGS. 4 and 5, an example of an actuator 104, including control bar 24, is illustrated. In this embodiment, the actuator 104 comprises an actuator housing 106 in which the control bar 24 is slidably mounted. The actuator housing 106 may comprise a tube structure 108 capped on one end by a cap structure 110 and having a mounting structure 112 on the opposite end constructed for sealed engagement with pipe 30. By way of example, the mounting structure 112 may be in the form of a flange 114 configured for sealed engagement with a corresponding flange coupled to pipe 30 over opening 32 so as to seal opening 32 with respect to actuator 104. However, other types of mounting structures 112 may be utilized to position actuator 104, and thus pipe isolation device 22, at the desired position along pipe 30.

Figure 6:
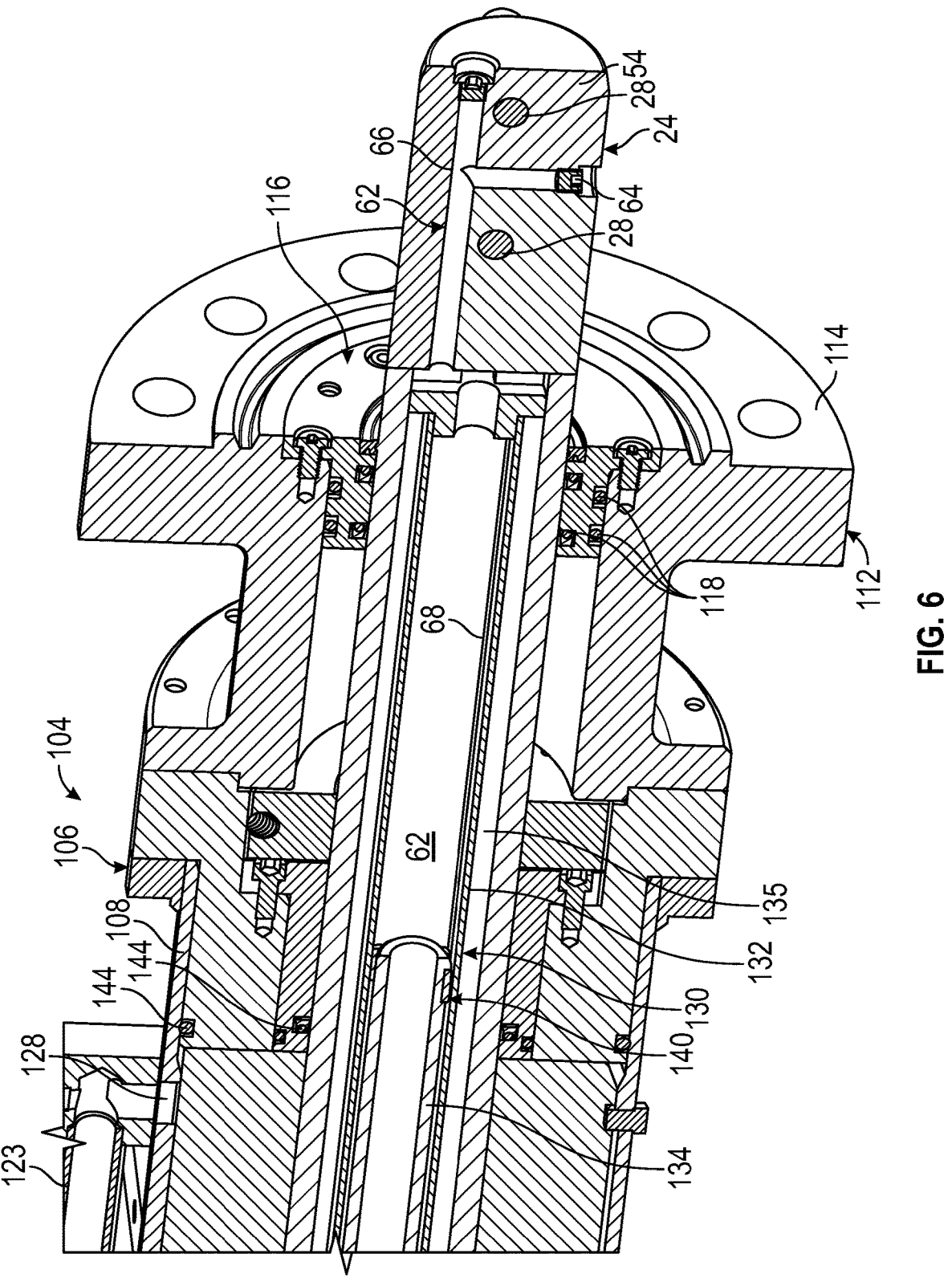
FIG. 6 is a cross-sectional view of a portion of the pipe isolation device actuator showing an attachment end of the control bar in accordance with embodiments of the present disclosure.

In the illustrated example, control bar 24 slidably extends through mounting structure 112 and is sealed with respect to mounting structure 112 via a seal assembly 116 having a suitable seal or seals 118, as further illustrated in FIG. 6. Sliding movement of the control bar 24 with respect to housing 106 is controlled by an actuation system 120. In the illustrated example, actuation system 120 is in the form of a hydraulic actuation system having a hydraulic controller 122 which controls the direction of flow with respect to hydraulic fluid entering housing 106. Hydraulic actuation fluid may be supplied to controller 122 under suitable pressure from a hydraulic fluid source.

As best illustrated in FIG. 5, hydraulic fluid may be directed by hydraulic controller 122 through corresponding hydraulic control lines 123 into the interior of housing 106 on one side or the other of a seal assembly 124 coupled to control bar 24. If the hydraulic fluid is directed to one side of the seal assembly 124 through a port 126 (see also FIG. 7), the seal assembly 124 and attached control bar 24 are driven to slidably extend farther from actuator housing 106 and to thus move the pipe isolation device 22 into the interior of pipe 30. However, if the hydraulic fluid is directed to the other side of seal assembly 124 through a port 128 (see also FIG. 6), the seal assembly 124 and attached control bar 24 are driven to slidably retract farther into actuator housing 106. As the control bar 24 retracts, the pipe isolation device 22 is withdrawn from pipe 30 through opening 32.

Figure 7:
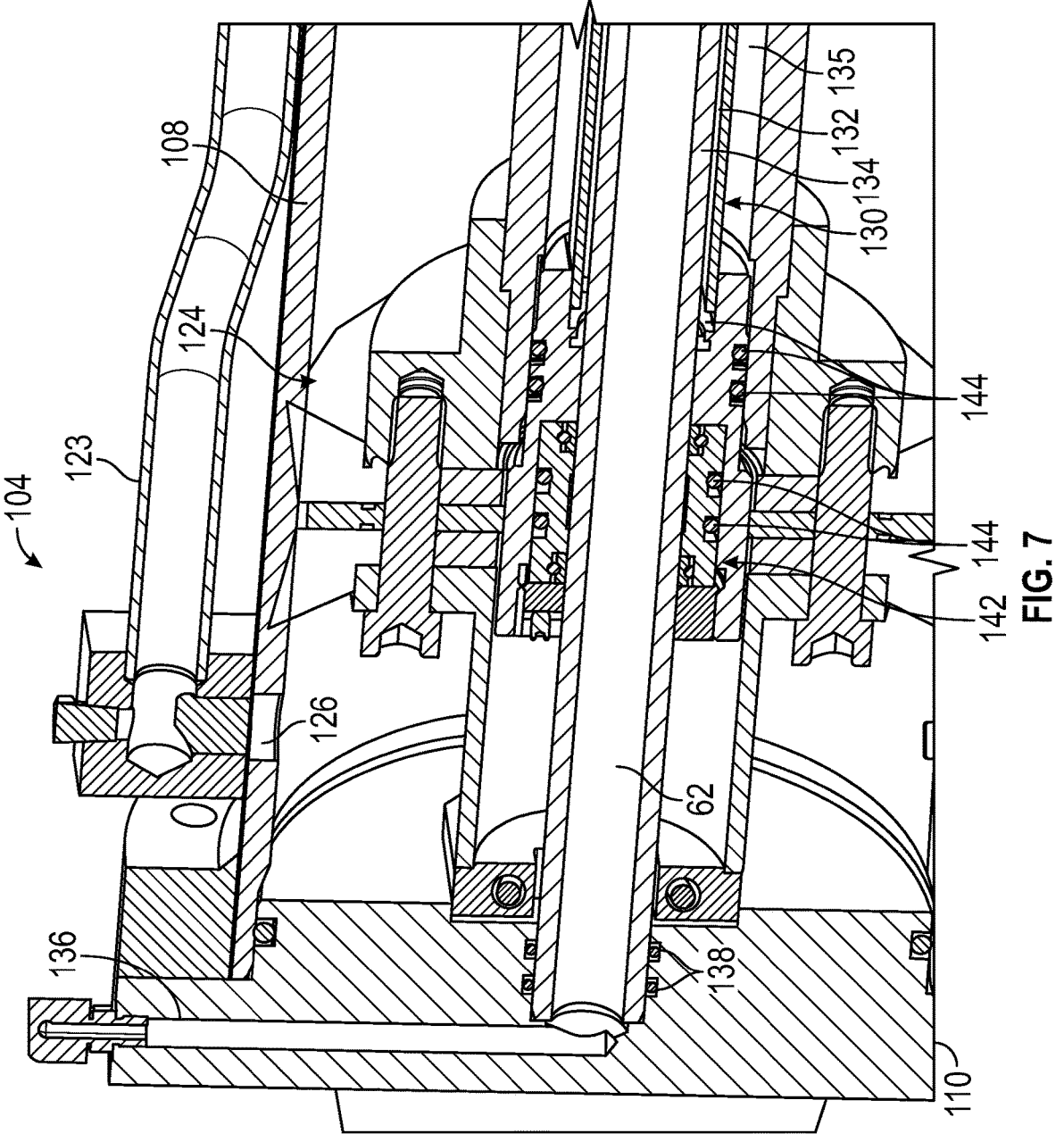
FIG. 7 is a cross-sectional view of another portion of the pipe isolation device actuator showing a distal end of the control bar which provides a continued bleed path to an exterior of the pipe isolation device actuator in accordance with embodiments of the present disclosure.

In the example illustrated, control bar 24 comprises an internal telescopic tube assembly 130 which maintains the control bar bleed passage 62 longitudinally through or substantially through the interior of the control bar 24. By way of example, the tube assembly 130 may comprise an outer tube 132 slidably mounted about an inner tube 134 and these tubes slide with respect to each other as the control bar 24 extends or retracts. The outer tube 132 is securely connected to a surrounding structure 135 of the control bar 24. Regardless of the extension position of control bar 24, the internal bleed passage 62 is maintained along the interiors of outer tube 132 and inner tube 134. As illustrated in FIG. 7, the bleed passage 62 may extend through the entire inner tube 134 and through the cap structure 110 to an exterior of actuator 104 via a lateral bleed passage 136. In this example, the inner tube 134 is received in a recess of the cap structure 110 and sealed thereto via one or more seals 138. In some embodiments, the bleed passage 62 may be routed through actuator 104 along various other paths within and/or external to control bar 24.

It should be noted the actuator 104 may comprise various other components. By way of example, an anti-rotation mechanism 140 may be positioned between the inner tube 134 and the outer tube 132, as illustrated in FIG. 6. The anti-rotation mechanism 140 may comprise a clip or other structure with flat spots positioned to slide along corresponding flat spots in tube assembly 130 to maintain the desired angular position of control bar 24. Furthermore, the inner tube 134 may be secured against rotation relative to actuator housing 106 via an additional anti-rotation mechanism 142, as illustrated in FIG. 7. By way of example, the additional anti-rotation mechanism 142 may utilize various structures which engaged tube assembly 130 and surrounding control bar structure 135 to provide the desired anti-rotation while allowing the desired sliding motion. Various seals 144 may be used between the inner tube 134, outer tube 132, and/or corresponding structures of the control bar 24 and/or overall actuator housing 106. In some embodiments, anti-rotation also may be provided via features located between inner tube 134 and the control bar structure 135 to thus potentially eliminate the use of outer tube 132.

Accordingly, the actuator 104 may be connected with pipe isolation device 22 via control bar 24 and then mounted on a flange or other type of mounting structure on pipe 30. The actuation system 120 may then be selectively operated to move control bar 24 in a desired linear direction to thus move the pipe isolation device 22 into the sealing position within pipe (see FIG. 1) or in the opposite direction to withdraw the pipe isolation device 22 from pipe 30.

If pressure builds up between first sealing head 38 and second sealing head 40 during operation, the cooperating bleed passages 76, 58, 62 effectively bleed the pressure from pipe isolation device 22 and along an interior of control bar 24 until being released from actuator 104 via lateral bleed passage 136. The ability to bleed excess pressure through the control bar 24 simplifies the pressure bleed route and reduces the number of components that would otherwise be attached, e.g. welded, to the pipe 30. It should be noted the bleed passage 62 through actuator 104 may be routed along other passages for at least a portion of the longitudinal distance through actuator 104. For example, a bleed conduit wrapped around or otherwise routed along control bar 24 could be used to provide the desired internal bleed route.

Depending on the parameters of a given pipe isolation operation, the configuration and use of overall pipe isolation system 20 may be adjusted. In many applications, two pipe isolation systems 20 are employed along pipe 30 so as to completely isolate the section of pipe 30 between the two isolation systems 20. This allows, for example, the intermediate section of pipe to be removed and replaced. Depending on the operation, the actuator 104 may be constructed in a variety of sizes with various control bar extension capabilities. The actuator 104 may be hydraulically operated or otherwise operated, e.g. pneumatically operated, electrically operated, or mechanically operated via a lead screw. Additionally, the pipe isolation device 22 may be constructed from various materials and with components of various sizes and configurations. The bleed passages, seals, slider pads, slide angles, interlocking slide mechanisms, and other features may be adjusted.

Although a few embodiments of the disclosure have been described in detail above, those of ordinary skill in the art will readily appreciate that many modifications are possible without materially departing from the teachings of this disclosure. For example, the pipe isolation device of the present disclosure may be modified by adding additional sealing heads to become a triple, or more, block and bleed apparatus. Accordingly, such modifications are intended to be included within the scope of this disclosure as defined in the claims. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A system for isolating a pipe via access through a lateral hole in the pipe, the system comprising:

a control bar head having a coupling feature for coupling with a control bar, the control bar head having a bleed passage extending therethrough to the coupling feature;

a first sealing head slidably engaged with the control bar head and having a first seal element, the first sealing head further comprising a first sealing head bleed passage therethrough, the first sealing head bleed passage engaging the control bar head via a bleed port gland; and a second sealing head slidably engaged with the first sealing head and having a second seal element, the first sealing head bleed passage extending to a region between the first sealing head and the second sealing head.

2. The system as recited in claim 1, wherein the bleed port gland slides along the control bar head as the first sealing head slides relative to the control bar head so as to place the bleed passage and the first sealing head bleed passage into or out of direct fluid communication.

3. The system as recited in claim 2, further comprising the control bar, the control bar being slidably engaged in an actuator, the control bar having a control bar bleed passage positioned for fluid communication with the bleed passage in the control bar head.

4. The system as recited in claim 3, wherein the control bar bleed passage is routed through the actuator.

5. The system as recited in claim 4, wherein the control bar bleed passage is routed longitudinally along an interior of the control bar to a distal end of the control bar and then to an exterior of the actuator.

6. The system as recited in claim 1, wherein the first sealing head is slidably engaged with the control bar head via interlocking rails.

7. The system as recited in claim 6, wherein the second sealing head is slidably engaged with the first sealing head via additional interlocking rails.

8. The system as recited in claim 7, wherein the first sealing head and the second sealing head are generally disk shaped.

9. The system as recited in claim 1, wherein sliders are mounted to the first and second sealing heads.

10. A system, comprising:

a pipe isolation device comprising a control bar head having a coupling feature for coupling with a control bar, the pipe isolation device configured for use in isolating a pipe via access through a lateral hole in the pipe;

an actuator coupled to the pipe isolation device, the actuator having the control bar which is linearly movable to insert and withdraw the pipe isolation device through the lateral hole in the pipe; and a bleed system extending between the pipe isolation device and the actuator, the bleed system comprising a bleed passage extending through the control bar head to the coupling feature, the bleed system providing a bleed route through the actuator, wherein the bleed route through the actuator is located longitudinally along an interior of the control bar;

wherein the pipe isolation device further comprises a first sealing head slidably engaged with the control bar head and having a first seal element, wherein the bleed system comprises a first sealing head bleed passage through the first sealing head for engagement with the control bar head via a bleed port gland.

11. The system as recited in claim 10, wherein the pipe isolation device further comprises a second sealing head slidably engaged with the first sealing head and having a second seal element the first sealing head bleed passage extending to a region between the first sealing head and the second sealing head.

12. The system as recited in claim 11, wherein the first sealing head is slidably engaged with the control bar head and the second sealing head is slidably engaged with the first sealing head via corresponding interlocking rails.

13. The system as recited in claim 12, wherein sliders are mounted to the first and second sealing heads.

14. A system for isolating a pipe via access through a lateral hole in the pipe, the system comprising:

a control bar head having a coupling feature for coupling with a control bar, the control bar head having a bleed passage extending therethrough to the coupling feature; and a sealing head slidably engaged with the control bar head and having a seal element, the sealing head further comprising a sealing head bleed passage therethrough, the sealing head bleed passage engaging the control bar head via a bleed port gland having a face seal, the bleed port gland being slidable along a surface of the control bar head while being spring biased toward the control bar head when the bleed passage of the control bar head and the sealing head bleed passage are aligned, the geometry of the bleed port gland being selected to further enhance compressive force against the bleed port gland and the face seal when exposed to differential pressure during operation.

15. The system as recited in claim 14, further comprising:

an additional sealing head slidably engaged with the sealing head and having an additional seal element, the sealing head bleed passage extending to a region between the sealing head and the additional sealing head.

16. The system as recited in claim 15, further comprising the control bar, the control bar being slidably engaged in an actuator, the control bar having a control bar bleed passage positioned for fluid communication with the bleed passage in the control bar head.

17. The system as recited in claim 16, wherein the control bar bleed passage is routed longitudinally along an interior of the control bar to a distal end of the control bar and then to an exterior of the actuator.

* * * * *